(12) United States Patent
Epsztein et al.

(10) Patent No.: US 12,704,208 B2
(45) Date of Patent: Aug. 11, 2026

(54) THERMOPLASTIC COMPOSITE HOSE FOR TRANSPORTING FLUID AND FLEXIBLE PIPE COMPRISING SAME

(71) Applicant: TechnipFMC Subsea France, Courbevoie (FR)

(72) Inventors: Thomas Epsztein, Rouen (FR); Anh-Tuan Do, Cormeilles en Parisis (FR); Loic Lugiery, Le Pecq (FR)

(73) Assignee: TechnipFMC Subsea France (FR)

( * ) Notice: Subject to any disclaimer, the term of this patent is extended or adjusted under 35 U.S.C. 154(b) by 404 days.

(21) Appl. No.: 18/573,815

(22) PCT Filed: Jun. 24, 2022

(86) PCT No.: PCT/EP2022/067312
§ 371 (c)(1),
(2) Date: Dec. 22, 2023

(87) PCT Pub. No.: WO2022/269024
PCT Pub. Date: Dec. 29, 2022

(65) Prior Publication Data

US 2024/0288100 A1 Aug. 29, 2024

(30) Foreign Application Priority Data

Jun. 25, 2021 (FR) ...................................... 21 06833

(51) Int. Cl.
*F16L 11/08* (2006.01)
*B32B 1/08* (2006.01)
(Continued)

(52) U.S. Cl.
CPC .............. *F16L 11/083* (2013.01); *B32B 1/08* (2013.01); *B32B 5/02* (2013.01); *B32B 27/12* (2013.01);
(Continued)

(58) Field of Classification Search
CPC . F16L 11/083; B32B 1/08; B32B 5/02; B32B 27/12; B32B 27/285; B32B 27/288;
(Continued)

(56) References Cited

U.S. PATENT DOCUMENTS 5,908,049 A * 6/1999 Williams .............. E21B 17/206 138/132
11,390,014 B2 7/2022 Bertolotti et al.
(Continued)

FOREIGN PATENT DOCUMENTS

CN 1162602 A 10/1997
GB 2 504 065 A 1/2014
(Continued)

OTHER PUBLICATIONS

Translation of 2021/100277 A1 (Year: 2021).*
(Continued)

*Primary Examiner* — William M Mccalister
(74) *Attorney, Agent, or Firm* — OSTROLENK FABER LLP

(57) ABSTRACT

A thermoplastic composite pipe intended for transporting fluids that includes, from the inside toward the outside:

a tubular internal sheath;

a reinforcing composite structure around the tubular sheath and which is bonded to the tubular sheath, the reinforcing composite structure comprising a winding of at least two laminated reinforcing layers, each reinforcing layer being made from a thermoplastic matrix comprising a polyether ether ketone having a specific molecular weight distribution and a Charpy impact strength greater than or equal to 55 kJ/m$^2$, and reinforced with carbon fibers, (Continued)

at least one sealing layer made of a thermoplastic material around the reinforcing composite structure;
and a hybrid flexible pipe comprising same.

11 Claims, 2 Drawing Sheets

(51) Int. Cl.
*B32B 5/02* (2006.01)
*B32B 27/12* (2006.01)
*B32B 27/28* (2006.01)

(52) U.S. Cl.
CPC .......... *B32B 27/285* (2013.01); *B32B 27/288* (2013.01); *B32B 2260/023* (2013.01); *B32B 2260/046* (2013.01); *B32B 2262/106* (2013.01); *B32B 2307/546* (2013.01); *B32B 2597/00* (2013.01)

(58) Field of Classification Search
CPC ........ B32B 2260/023; B32B 2260/046; B32B 2262/106; B32B 2307/546; B32B 2597/00
USPC .......................................................... 138/132
See application file for complete search history.

(56) References Cited

U.S. PATENT DOCUMENTS

| | | | | |
|---|---|---|---|---|
| 11,781,017 | B2 | 10/2023 | Paul et al. | |
| 2002/0040124 | A1 | 4/2002 | Gharda et al. | |
| 2013/0269819 | A1* | 10/2013 | Ruby | B29C 48/022 156/172 |
| 2014/0158247 | A1* | 6/2014 | Kristiansen | F16L 11/082 138/132 |
| 2015/0027580 | A1* | 1/2015 | Glejbol | B32B 5/26 428/128 |
| 2017/0113444 | A1* | 4/2017 | Harlow | B32B 27/34 |
| 2022/0243843 | A1 | 8/2022 | Hochstetter | |
| 2023/0240289 | A1* | 8/2023 | Niada | D06N 3/045 424/404 |

FOREIGN PATENT DOCUMENTS

| | | | | |
|---|---|---|---|---|
| WO | WO 2006/059220 | A2 | 6/2006 | |
| WO | WO 2018/091693 | A1 | 5/2018 | |
| WO | WO 2019/068757 | A1 | 4/2019 | |
| WO | WO 2019/150060 | A1 | 8/2019 | |
| WO | WO 2019/180050 | A1 | 9/2019 | |
| WO | WO 2021/019180 | A1 | 2/2021 | |
| WO | WO-2021100277 | A1 * | 5/2021 | H05K 1/0393 |
| WO | WO 2022/269024 | A1 | 12/2022 | |

OTHER PUBLICATIONS

International Search Report mailed Sep. 21, 2022 in corresponding PCT International Application No. PCT/EP2022/067312.

Search Report mailed Mar. 11, 2022 in corresponding French Application No. 2106833.

"Thermoplastic composite pipes", Standard, DNV-GL-ST-F119 (Det Norske Veritas GL). Sep. 2019.

"Specification for Unbonded Flexible Pipe", API Specification 17J, 4th Edition, the American Petroleum Institute, May 2014.

Dodds, Neville, et al. "Unbonded Flexible Pipe: Composite Reinforcement for Optimized Hybrid Design", Offshore Technology Conference, May 2015.

* cited by examiner

THERMOPLASTIC COMPOSITE HOSE FOR TRANSPORTING FLUID AND FLEXIBLE PIPE COMPRISING SAME

CROSS-REFERENCE TO RELATED APPLICATIONS

The present application is a 35 U.S.C. §§ 371 national stage application of International Application No. PCT/EP2022/067312, filed Jun. 24, 2022, which claims priority to French Patent Application No. 2106833, filed Jun. 25, 2021, the contents of which are incorporated herein by reference.

FIELD OF THE INVENTION

The present invention relates to a thermoplastic composite pipe able to be used for transporting fluids, and to a flexible pipe comprising said thermoplastic composite pipe and able to be used for transporting fluids, hydrocarbons in particular.

BACKGROUND

Thermoplastic composite pipes are known under the name Thermoplastic Composite Pipes (TCPs) and are described in particular in standard document DNVGL-ST-F119, «Standard Practice—Thermoplastic composite pipes», published in September 2019 by DNV GL (Det Norske Veritas GL).

Thermoplastic composite pipes generally comprise, from the inside toward the outside:

- an inner tubular polymer liner,
- an intermediate reinforcing tubular structure formed of several wound strips of composite material, this intermediate layer being bonded to the inner liner, and
- optionally a protective outer polymer cover.

The reinforcing tubular structure theoretically being fluid-tight, the inner tubular liner is optional. However, in practice, most of these thermoplastic composite pipes comprise an inner tubular liner to guarantee the fluid tightness of the pipe in the event that the tubular structure should have a manufacturing defect detrimental to fluid tightness. In addition, the presence of the inner tubular liner allows facilitated preparation of the thermoplastic composite pipe. This first layer effectively forms a central core used as support to wind the plurality of composite laminates forming the reinforcing tubular structure.

The reinforcing tubular structure is bonded to the inner tubular liner to prevent collapse of the inner tubular liner in the event of sudden decompression of the pipe transporting the fluid, in particular if it is transporting gases which is the case with hydrocarbons.

By «bonded», it is meant that the reinforcing tubular structure and inner tubular liner are not able to move relative to each other. They can be bonded by gluing (via glue or adhesive) or by welding.

The outer protective cover is optional but, if present, it is advantageously bonded to the reinforcing tubular structure, the assembly thus forming a TCP of fully bonded structure.

Said thermoplastic composite pipes are marketed in particular by Magma Global Ltd (TCP of registered trademark m-Pipe®) and Strohm, or are described in the literature. For example, WO 2006/059220 describes a pipe comprising an inner liner in thermoplastic material, in particular in polyamide, in polyvinylidene fluoride (PVDF), in poly(phenylene sulfide) (PPS), in polyether ether ketone (PEEK), around which there is wound a strip in reinforced thermoplastic material e.g. with glass or carbon fibres, this strip being wound around the inner liner and bonded thereto. A reinforcing layer with impregnated glass, carbon or aramid fibres in a thermoplastic resin can be added.

One of the obstacles with the use of TCPs is their low flexural performance which induces a high minimum bend radius (MBR). The bonded structure of TCPs makes them more rigid than pipes formed of unbonded layers i.e. in which the layers are able freely to move relative to each other. This rigidity of TCPs is chiefly observed when the thermoplastic matrix of the intermediate reinforcing tubular structure is based on polyether ether ketone (also called PEEK or poly(oxy1,4-phenyleneoxy-1,4-phenylenecarbonyl-1,4-phenylene). There is therefore a need for the development of TCPs having improved flexural performance.

TCPs can be used as such, but they can also be integrated in more complex tubular structures. In particular, TCPs can be used inside flexible pipes called hybrid flexible pipes which have an intermediate structure between that of thermoplastic composite pipes TCPs and that of flexible pipes of unbonded type, described below.

Most flexible pipes used in the offshore oil industry are flexible pipes generally comprising from the inside toward the outside:

- optionally, a metal carcass,
- an inner fluid-tight polymer liner,
- at least one reinforcing layer composed of metal wires or in composite material helically wound around the inner liner (there is typically at least one tensile armour layer, generally two tensile armour layers),
- an outer fluid-tight polymer sheath.

These pipes are generally of unbonded type. By «unbonded», it is meant that the layers are able freely to move relative to each other. Typically, the adjacent layers are not glued to each other, welded to each other, and they are not embedded in a polymer or elastomer sheath.

Said flexible pipes are described in particular in the standard document API 17J, «Specification for Unbonded Flexible Pipe», $4^{th}$ Edition, May 2014 published by the American Petroleum Institute. They are particularly used in deep waters in the oil and gas industry. Typically, they are used for transporting hydrocarbon fluids, or for the reinjection of carbon dioxide into a subsea reservoir. Flexible oil pipes generally extend through a body of water between a surface assembly and a seabed assembly. These pipes can also extend between two surface assemblies.

The seabed assembly is intended to collect the fluid extracted at the bottom of the body of water. The surface assembly is generally a floating assembly. It is intended to collect, potentially treat, and distribute the fluid. The surface assembly can be a semi-submersible platform, a FPSO facility or other floating assembly.

In some cases, for the extraction for fluids in deep waters, the flexible pipe has a length of more than 800 m, even more than 1000 m, or 2000 m for applications in ultra-deep waters.

For large depths, the flexible pipe is sized to withstand very high hydrostatic pressure, for example 200 bar for a pipe immersed at a depth of 2000 m.

In addition, the flexible pipe is generally sized to withstand an axial pressure greater than the total weight of the flexible pipe suspended from a surface assembly and extending under the water from the surface to the seabed. This is particularly the case when the flexible pipe is used as riser intended to ensure a vertical link between the seabed and the surface assembly. The ability of the flexible pipe to carry its own weight when suspended in water particularly facilitates the installation thereof at sea by a pipe-laying vessel.

However, the weight of these flexible pipes is generally very heavy, which means that the installation thereof in deep and ultra-deep waters is complex and costly. In addition, risers of this type must generally be equipped with buoys for deep water applications, which generates additional costs. Finally the reinforcing layers, if they are in metal, are generally sensitive to corrosion, in particular to corrosion by acid gases of $H_2S$ and $CO_2$ type contained in the hydrocarbons of some deposits.

To overcome these problems, more lightweight flexible pipes having a reinforcing tubular structure in composite material and comprising a thermoplastic matrix and reinforcing fibres embedded in the matrix have been developed, namely so-called «hybrid» flexible pipes.

In so-called «hybrid» flexible pipes, the metal carcass, and inner fluid-tight liner described above are replaced by a thermoplastic composite pipe. So-called «hybrid» flexible pipes therefore comprise from the inside toward the outside:

- an inner tubular polymer liner,
- a reinforcing tubular structure formed by the winding of several strips of composite material, this intermediate layer being bonded to the tubular polymer liner,
- an intermediate polymer sheath,
- at least one reinforcing layer composed of metal wires or a composite material helically wound around the intermediate polymer sheath (typically at least one tensile armour layer),
- an outer fluid-tight polymer sheath.

The reinforcing tubular structure generally takes up most of the radial forces applied to the hybrid flexible pipe. The reinforcing tubular structure, bonded to the tubular polymer liner, also has a barrier function against gases such as acid gases of $H_2S$ and $CO_2$ type contained in the hydrocarbons transported inside the tubular polymer liner. It therefore provides protection for the reinforcing metal elements of the flexible pipe against corrosion phenomena, or for the composite material of the reinforcing layer against degradation caused by these gases.

The reinforcing layer(s) composed of metal wires or in composite material are similar to those of flexible pipes of unbonded type i.e. they are composed of helically wound wires. They are generally tensile armour layers.

In addition, and optionally, these hybrid flexible pipes may comprise an inner carcass positioned inside the inner tubular polymer liner, said carcass having the function of increasing resistance to collapse of the pipe. The inner carcass is formed for example of a profiled metal strip wound in a spiral. The turns of the spiral are advantageously pinned to each other to take up the load of collapse forces.

These hybrid flexible pipes are particularly described in the article: «Unbonded Flexible Pipe: Composite Reinforcement for Optimized Hybrid Design» written by N. Dodds, V. Jha, J. Latto and D. Finch, and published under reference OTC-25753 at the «Offshore Technology Conference» held in Houston May 4 to 7 2015, or in applications GB 2 504 065 and WO 2018/091693. These two applications describe hybrid flexible pipes in which the reinforcing tubular structure is obtained from the winding of several strips having a polymer matrix, PEEK being cited among several other polymers that can be envisaged for this matrix, and in which reinforcing fibres are embedded which can be in glass, carbon, or aramid.

One of the impediments to the use of hybrid flexible pipes, in particular those having a reinforcing tubular structure formed by the winding of several PEEK-based strips, is the rigidity thereof. The paragraph straddling pages 2 and 3 of application WO 2021/019180 states that one major disadvantage in using PEEK as polymer matrix of a composite reinforcement is the rigidity thereof, scarcely compatible with the obtaining of flexible pipes The rigidity of these hybrid flexible pipes has the consequence that their minimum bend radius (MBR) is higher than that of the above-described flexible pipes of unbonded type conforming to API 17J. Yet flexural capability is a major property during pipe winding phases during manufacture, when being loaded on pipe-laying vessels and at the sea installation phase. This implies that production units and equipment for laying flexible pipes of unbonded type conforming to API 17J are little adapted for the production and laying of hybrid flexible pipes. The need to develop production units and laying equipment dedicated to hybrid flexible pipes hinders the development thereof.

SUMMARY OF THE INVENTION

It is one of the objectives of the invention to provide a thermoplastic composite pipe able to be used for transporting fluids, having improved flexural performance and in particular having a reduced minimum bend radius.

A further objective of the invention is to provide a hybrid flexible pipe having improved flexural performance and in particular having a reduced minimum bend radius.

For this purpose, a first subject of the invention concerns a thermoplastic composite pipe intended for transporting fluids comprising from the inside toward the outside:

- a tubular internal sheath of axis (A-A') defining an inner passageway for the circulations of fluids; and
- a reinforcing composite structure around the tubular sheath and which is bonded to the tubular sheath, the reinforcing composite structure comprising a winding of at least two laminated reinforcing layers, each reinforcing layer having a thermoplastic matrix comprising a polyether ether ketone (PEEK) and reinforced with carbon fibres, said 15 polyether ether ketone having:
- a molecular weight distribution by gel permeation chromatography (GPC) such that:
  - the number average molecular weight (Mn) is higher than 38,000 g/mol,
  - the peak molecular weight (Mp) is higher than 70,000 g/mol, and the polydispersity index (PI) is lower than 2.3, and
- a Charpy impact strength, measured at 23° C. according to standard ISO 179/1eA of 2010, greater than or equal to 5.5 $KJ/m^2$.

A thermoplastic matrix comprising PEEK and reinforced with carbon fibres for each reinforcing layer is advantageous in that:

- the carbon fibres and PEEK are chemically and thermally stable. The PEEK is stable up until close to the glass transition temperature thereof, generally around 140° C.
- said reinforcing layer has very low permeability. The permeability coefficients of the reinforcing layer to $CO_2$ and $H_2S$ measured at 80° C. are generally lower than $5\cdot10^{-8}$ $cm^3(STP)\cdot cm^2/cm^3\cdot s\cdot bar$, advantageously lower than $1\cdot^{10-8}$ $cm^3(STP)\cdot cm^2/cm^3\cdot s\cdot bar$.

The molecular weight distribution of polyether ether ketone is characterized by gel permeation chromatography (GPC), typically eluting with dichloromethane (DCM)/dichloroacetic acid (DCAA), for example with a DCM/DCAA volume ratio of 80:20. GPC calibration can be performed with polystyrene standards (PS) of 580 g/mol to 3 152 000 g/mol.

The polydispersity index (PI) is the ratio of the weight average molecular weight (Mw) to the number average molecular weight (Mn). The higher this index the more the molecular weight has values that are dispersed from one polymer chain to another. A polymer in which all the polymer chains are of same length has a polydispersity index of 1. The polydispersity index (IP) of PEEK is less than 2.3, preferably less than 2.2.

The PEEK used in the thermoplastic matrix of each reinforcing layer additionally has a Charpy impact strength, measured at 23° C. according to standard ISO 179/1eA of 2010, greater than or equal to 5.5 KJ/m$^2$, typically greater than or equal to 6.0 KJ/m$^2$, in particular greater than or equal to 7.0 KJ/m$^2$, preferably greater than or equal to 8.0 kJ/m$^2$.

Preferably in the thermoplastic composite pipe of the invention, the PEEK used in the thermoplastic matrix of each reinforcing layer has viscosity, such as measured at 400° C. according to standard ISO 11443 of 2021, higher than 200 Pa·s, in particular higher than 250 Pa·s, preferably higher than 300 Pa·s. The viscosity of PEEK particularly increases with the weight average molecular weight thereof (Mw). The viscosity of PEEK can be adjusted for example by varying the quantity of anhydrous methane sulfonic acid (AMSA) condensation agent relative to the initial quantity of phenoxyphenoxybenzoic acid (PPBA) at the polymerization reaction for polymerization via electrophilic addition and/or by varying the polymerization temperature and/or reaction time.

The inventors have discovered that a composite reinforcing structure with reinforcing layers based on a PEEK having a molecular weight distribution and Charpy impact strength such as defined above, allows a thermoplastic composite pipe to be obtained having flexural performance that is very strongly improved. This improvement is enhanced if the PEEK has the above-defined viscosity.

The inventors have discovered that, contrary to all expectations, this improvement in flexural performance very largely exceeds an improvement in the flexural performance obtained when using a PEEK not meeting the above definition and when lowering the content of reinforcing fibre.

The thermoplastic composite pipe of the invention advantageously has a minimum bend radius (MBR) that is smaller than that of a thermoplastic composite pipe in which the reinforcing layers of the reinforcing composite structure comprise PEEK that does not have said molecular weight distribution and/or said Charpy impact strength. This lessening of the MBR is enhanced when the PEEK has the above-defined viscosity.

This improved flexural performance also makes it possible, using the same manufacturing equipment and same installation equipment, to prepare and install offshore a thermoplastic composite pipe having a larger inner diameter.

The PEEK used in the thermoplastic matrix of each reinforcing layer can be linear or branched, and is preferably branched. A PEEK having an advantageously controlled and limited branched polymer chain generally has improved mechanical properties, and in particular improved impact strength and/or fracture toughness.

The terminal groups of the PEEK used in the thermoplastic matrix of each reinforcing layer are typically chosen from the group composed of F, H, diphenyl ether, phenyl, methylphenyl (in particular o-, m- or p-tolyl), dimethylphenyl (in particular o-, m- or p-xylyl) and methoxyphenyl (in particular o-, m- or p-methoxyphenyl). These groups, and in particular the fluorine, are advantageously chemically and thermally stable.

The percent crystallinity of the PEEK used in the thermoplastic matrix of each strip in composite material of each reinforcing layer, such as measured by differential scanning calorimetry (DSC), is from 10 to 50% in particular, preferably from 20 to 40%, more particularly preferred from 30 to 40%.

The percent crystallinity of the PEEK used in the thermoplastic matrix and measured after fabrication of the composite reinforcing layer often differs from the percent crystallinity of the initial strip of composite material (part of the PEEK being melted when fabricating the reinforcing layer, another part not being melted but being thermally affected). The percent crystallinity of the PEEK used in the thermoplastic matrix and measured after fabrication of the reinforcing layer of the reinforcing tubular structure of the thermoplastic composite pipe, such as measured by differential scanning calorimetry (DSC), is generally from 20 to 40%, preferably from 25 to 40%. A percent crystallinity that is too low can be detrimental to permeability and/or resistance to chemical ageing.

The PEEK used in the thermoplastic matrix of each reinforcing layer can be obtained by polymerization via nucleophilic substitution, typically by polycondensation of 4,4'-difluorobenzophenone (BDF) with hydroquinone (HQ) or a salt thereof. Polymerization is generally performed in a solvent with high boiling point such as diphenylsulfone (DPS). Polymerization by nucleophilic substitution generally allows a linear PEEK to be obtained. The terminal groups of the PEEK are generally a fluorine.

Alternatively, the PEEK used in the thermoplastic matrix of each reinforcing layer can be obtained by polymerization via electrophilic addition, typically by polymerization of phenoxyphenoxybenzoic acid (PPBA) in a mixture of methane sulfonic acid (MSA) and anhydrous methane sulfonic acid (AMSA). This mixture acts both as solvent and as catalyst of the polymerization reaction. In particular, it can be the method described in application US 2002/0040124 or CN 1162602A. The polymerization method via electrophilic addition allows a PEEK to be obtained comprising branches, and in controlled manner, which can lead to an improvement in mechanical properties and in particular impact strength and/or fracture toughness. The terminal groups of the PEEK obtained with this method are generally chosen from among the ether groups of diphenyl, phenyl, methylphenyl (in particular o-, m- or p-tolyl), dimethylphenyl (in particular o-, m- or p-xylyl) or methoxyphenyl (in particular o-, m- or p-methoxyphenyl).

Each reinforcing layer has a thermoplastic matrix reinforced with carbon fibres.

The carbon fibres can be sized or unsized, and are preferably unsized.

The tow numbers thereof (number of filaments forming a bundle) are generally less than or equal to 50K, in particular less than or equal to 24K, preferably less than or equal to 12K. 50K corresponds to 50 000 filaments forming the bundle.

The diameter of the carbon fibres is generally less than 10 μm, in particular less than 8 μm, for example between 4 μm and 8 μm.

Their density is typically from 1.7 to 1.9 g/cm$^3$.

Preferably, the carbon fibres have a size content such as determined according to standard ISO 10548 of 2002 corrected in 2008 of less than 0.4%, in particular less than 0.2%, and preferably zero. For example, they are carbon fibres of grade AS4, AS4a, AS7, marketed by Hexcel. The reinforcing layers based on a PEEK reinforced with said carbon fibres have improved mechanical properties, in particular interlaminar, transverse and in-plane shear strength respectively characterized following standards ASTM D2344 of 2016, ASTM D5450 of 2016 and ASTM D3518M of 2018, compared with carbon fibres having a greater size content.

The carbon fibres generally have a breaking strength higher than 3 GPa, advantageously higher than 4 GPa, such as measured at 23° C. according to standard ASTM D885M-10A(2014)e1.

In the present application, the terms «breaking strength» and «yield strength» have the same meaning and designate the ultimate tensile strength measured by tensile testing.

In addition, the carbon fibres advantageously have a tensile modulus higher than 200 GPa, in particular higher than 220 GPa, such as measured at 23° C. according to standard ASTM D885M-10A(2014)e1.

In the present application, the terms «tensile modulus», «Young's modulus» and «modulus of elasticity» have the same meaning and designate the modulus of elasticity measured by tensile testing.

Preferably, the fibre content by volume of the carbon fibres in each reinforcing layer is from 30 to 70%, preferably from 40 to 60%, more particularly preferred from 45 to 55% relative to the volume of the reinforcing composite layer. This volume content can be determined according to standard NF EN 2564 de 2018. Therefore, a fibre content by volume of the carbon fibres in the ranges of 30-70%, preferably of 40-60%, more particularly preferably of 45-55% advantageously provides a good compromise between these strengths.

The carbon fibres, in each reinforcing layer, are preferably arranged unidirectionally in the polymer matrix. They are then parallel to each other.

As explained above, the reinforcing composite structure bonded to the tubular inner sheath imparts radial strength to the thermoplastic composite pipe. The reinforcing composite structure prevents collapse of the tubular inner sheath in the event of sudden decompression of the pipe transporting the fluid.

The thermoplastic composite pipe can be devoid of an additional outer layer. The outermost layer of the thermoplastic composite pipe is then the reinforcing composite structure.

Alternatively, the thermoplastic composite pipe may comprise a sealing layer in a thermoplastic material around the reinforcing composite structure. In general, this sealing layer is then the outermost layer of the reinforcing composite structure.

The presence of the sealing layer, which therefore overwraps the reinforcing composite structure, limits and preferably fully prevents ingress of the external medium, of water in particular, inside the thermoplastic composite pipe. In particular, it provides protection for the reinforcing composite structure against the harmful effects of the external medium, in particular by preventing the formation of discontinuities.

A second subject of the invention concerns a flexible pipe intended for transporting fluids comprising, from the inside toward the outside:

- the thermoplastic composite pipe defined above;
- at least one tensile armour layer not bonded to the outermost layer of the thermoplastic composite pipe, the at least one tensile armour layer comprising at least one armour element wound around said outermost layer; and
- optionally, an outer sealing sheath arranged around the at least one tensile armour layer.

The outermost layer of the thermoplastic composite pipe is generally either the reinforcing composite structure, or the sealing layer when the thermoplastic composite pipe contains said layer.

The flexible pipe of the invention is therefore a «hybrid» flexible pipe.

Since the flexible pipe of the invention comprises the thermoplastic composite pipe of the invention, it also has improved flexural performance compared with a flexible pipe in which the PEEK does not have the molecular weight distribution and/or Charpy strength such as defined above. The flexible pipe of the invention advantageously has a smaller minimum bend radius than a flexible pipe in which the reinforcing layers comprise a PEEK not meeting the above definition.

It is also possible, using existing manufacturing and installation equipment already used for flexible pipes such as described in API 17J, to design, manufacture and install off-shore a "hybrid" flexible pipe having a larger inner diameter than a flexible "hybrid" pipe in which the PEEK does not have the molecular weight distribution and/or Charpy strength such as defined above.

In addition, this improved flexural performance allows the flexible pipe of the invention to be prepared in production units usually used to manufacture flexible pipes of unbonded type conforming to API 17J, and the use of the same laying equipment such as the carousel, reels and/or lay towers. These advantages allow a drastic reduction in costs since the development of production units and laying equipment dedicated to the hybrid flexible pipes of the invention is no longer required. By reducing the minimum bend radius, it is thus possible to produce flexible pipes of larger diameters whilst limiting industrial investments, A third subject of the invention concerns a method for preparing the thermoplastic composite pipe defined above, comprising the following steps:

- providing a tubular sheath of central axis (A-A') defining an inner passageway for the circulation of fluids;
- forming a reinforcing composite structure around the tubular sheath and bonded to the tubular sheath, the reinforcing composite structure being formed by winding at least two laminated reinforcing layers, each reinforcing layer having a thermoplastic matrix comprising a PEEK such as defined above and reinforced with carbon fibres;
- optionally, forming a sealing layer in thermoplastic material around the reinforcing composite structure.

The forming of the sealing layer can be obtained by winding at least two strips of a thermoplastic material around the reinforcing composite structure, and welding the at least two strips together. Alternatively, the sealing layer is formed by extruding a thermoplastic material onto the reinforcing composite structure.

A fourth subject of the invention concerns a method for preparing the flexible pipe defined above, comprising the following steps:

- providing the thermoplastic composite pipe such as defined above;
- arranging around the outermost layer of the thermoplastic composite pipe at least one tensile armour layer that is not bonded to said outermost layer, the at least one tensile armour layer comprising at least one armour element wound around said outermost layer; and
- optionally, placing an outer sealing layer around the at least one tensile armour layer.

The method for preparing the flexible pipe may comprise the preparation of the thermoplastic composite pipe. The method for preparing the flexible pipe may therefore comprise the following steps:

- providing a tubular sheath of central axis (A-A') defining an inner passageway for the circulation of fluids;
- forming a reinforcing composite structure around the tubular sheath and bonded to the tubular sheath, the reinforcing composite structure being formed by winding at least two laminated reinforcing layers, each reinforcing layer having a thermoplastic matrix comprising a PEEK such as defined above and reinforced with carbon fibres;
- arranging around the reinforcing composite structure at least one tensile armour layer, not bonded to the reinforcing composite structure, the at least one tensile armour layer comprising at least one armour element wound around the reinforcing composite structure; and
- optionally, arranging an outer sealing layer around the at least one tensile armour layer.

Alternatively, when a sealing layer in thermoplastic material is formed around the reinforcing composite structure, the method for preparing the flexible pipe may comprise the following steps:

- providing a tubular sheath of central axis (A-A') defining an inner passageway for the circulation of fluids;
- forming a reinforcing composite structure around the tubular sheath and bonded to the tubular sheath, the reinforcing composite structure being formed by winding at least two laminated reinforcing layers, each reinforcing layer having a thermoplastic matrix comprising a PEEK such as defined above and reinforced with carbon fibres;
- forming, around the reinforcing composite structure, a sealing layer in thermoplastic material;
- arranging, around the sealing layer, at least one tensile armour layer not bonded to the sealing layer, the at least one tensile armour layer comprising at least one armour element wound around the sealing layer; and
- optionally, arranging an outer sealing sheath around the at least one tensile armour layer.

A fifth subject of the invention concerns the use of the thermoplastic composite pipe such as defined above or of the flexible pipe defined above for transporting fluids, hydrocarbons in particular. The invention also concerns a method for transporting fluids, hydrocarbons in particular, comprising the transport of the fluid inside the thermoplastic composite pipe defined above or the flexible pipe defined above. At the time of transport, the pressure inside the flexible pipe is generally higher than 100 bar, and can even reach 1000 bar, and the temperature is generally higher than 90° C., particularly higher than 110° C., and at times higher than 130° C., even 170° C.

A sixth subject of the invention concerns the use of a polyether ether ketone having:

- a molecular weight distribution by gel permeation chromatography (GPC) such that:
  - the number average molecular weight (Mn) is higher than 38,000 g/mol,
  - the peak molecular weight (Mp) is higher than 70,000 g/mol, and
  - the polydispersity index (PI) is lower than 2.3,
- Charpy impact strength measured at 23° C. according to standard ISO 179/1eA of 2010 is greater than or equal to 5.5 kJ/m$^2$,
- and optionally viscosity, such as measured at 400° C. according to standard ISO 11443 of 2021, higher than 200 Pa·s, as polymer material of a carbon fibre-reinforced thermoplastic matrix of laminated reinforcing layers wound to form a reinforcing composite structure of a thermoplastic composite pipe intended for transporting fluids and comprising from the inside toward the outside:

- a tubular internal sheath of axis (A-A') defining an inner passageway for the circulation of fluids;
- said reinforcing composite structure around the tubular sheath and bonded to the tubular sheath,
- optionally at least one sealing layer in thermoplastic material around the reinforcing composite structure, to reduce the minimum bend radius of said thermoplastic composite pipe and/or to increase the flexural strain rate at the damage threshold of said thermoplastic composite pipe.

The damage threshold can be determined by performing different bending tests at different strain levels, and by verifying the presence of cracking of the reinforcing layer via destructive analysis of optical microscopy or electronic microscopy type. Three types of results can be obtained. The first type of result corresponds to no cracking. The second type of result corresponds to the observation of one or more non-through-wall cracks. A crack is qualified as non-through-wall when it does not extend from the inner skin of the reinforcing layer to the outer skin of the reinforcing layer. A third type of result corresponds to the observation of one or more through-wall cracks. A crack is qualified as through-wall when it extends from the inner skin of the reinforcing layer to the outer skin of the reinforcing layer. The damage threshold is determined by the strain level to be applied to allow observation of one or more non-through-wall cracks. The threshold of through-wall cracking is determined by the strain level to be applied to allow observation of one or more through-wall cracks.

Advantageously, the bending strain rate corresponding to the damage threshold of the thermoplastic composite pipe is greater than 2.0%, in particular greater than 2.5%, more advantageously greater than 3.0%.

Advantageously, the flexural strain rate corresponding to the through-wall cracking threshold is greater than 3.0%, in particular greater than 4.0%, more advantageously greater than 5.0%.

The invention also concerns the use of said polyether ether ketone as polymer material of a carbon fibre-reinforced thermoplastic matrix of laminated reinforcing layers that are wound to form a reinforcing composite structure of a flexible pipe intended for transporting fluids and comprising, from the inside toward the outside:

- a tubular internal sheath of axis (A-A') defining an inner passageway for the circulation of fluids;
- a reinforcing composite structure around the tubular sheath and which is bonded to the tubular sheath, the reinforcing composite structure comprising a winding of at least two laminated reinforcing layers, each reinforcing layer having a thermoplastic matrix comprising a polyether ether ketone (PEEK) reinforced with carbon fibres.
- optionally, at least one sealing layer in a thermoplastic material around the reinforcing composite structure,
- at least one tensile armour layer not bonded to the adjacent layer on the inner side (i.e. to the reinforcing composite structure or to the sealing layer if any), the at least one tensile armour layer comprising at least one armour element wound around said adjacent layer, and optionally, an outer sealing layer arranged around the at least one tensile armour layer;

to reduce the minimum bend radius of said flexible pipe and/or to increase the flexural strain rate at the damage threshold of said flexible pipe.

Advantageously, the flexural strain rate at the damage threshold of the flexible pipe is greater than 2.0%, in particular greater than 2.5%, more advantageously greater than 3.0%.

Advantageously, the flexural strain rate corresponding to the through-wall cracking threshold is greater than 3.0%, in particular greater than 4.0%, more advantageously greater than 5.0%.

BRIEF DESCRIPTION OF THE DRAWINGS

The invention will be better understood on reading the following description given solely as an example and with reference to the appended Figures in which.

DETAILED DESCRIPTION

In the remainder hereof, the terms «outer» or «external» and «inner» or «internal» are to be construed respectively as radially furthest distant from the axis of the thermoplastic composite pipe (or flexible pipe) and as radially closest to the axis of the thermoplastic composite pipe (or flexible pipe).

The Figures illustrate an alternative in which the thermoplastic composite pipe comprises a sealing layer 22. It would remain within the scope of the invention if this layer is not included.

Figure 1:
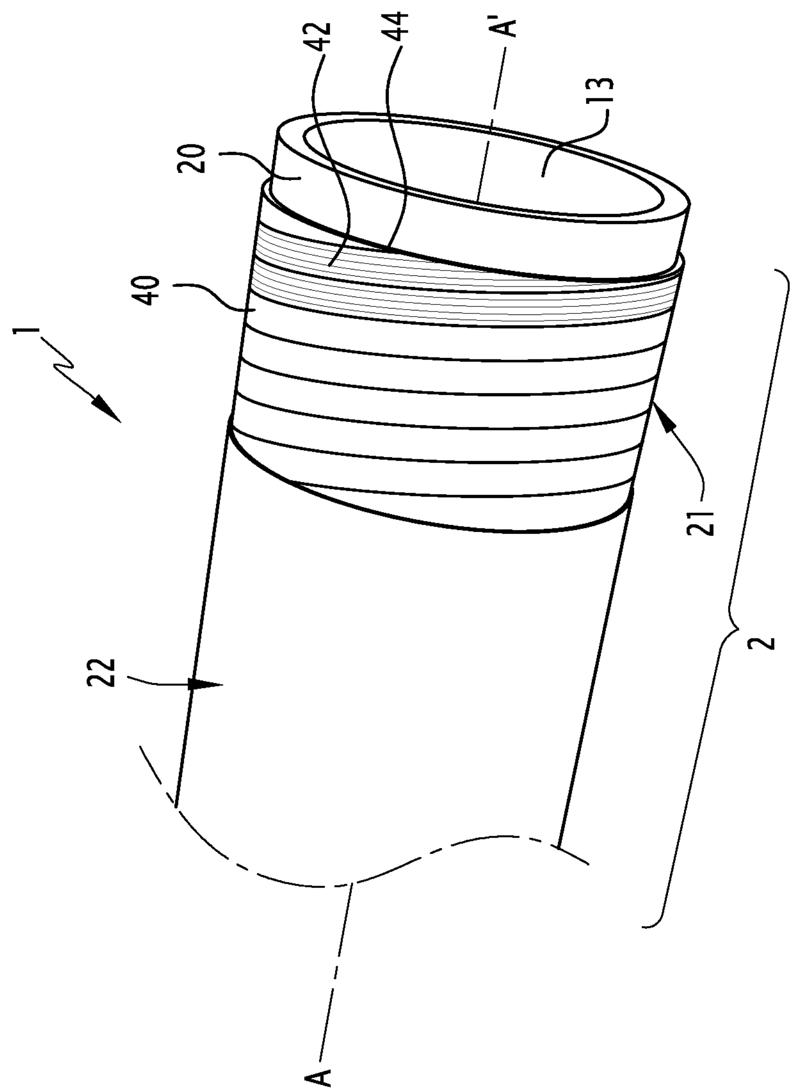
FIG. 1 is a perspective, partial cutaway view of a thermoplastic composite pipe of the invention.

A thermoplastic composite pipe 1 of the invention is schematically illustrated in FIG. 1.

The thermoplastic composite pipe 1 comprises a central section 2 partly illustrated in FIG. 1. At each of the axial ends of the central section 2, it comprises an end piece (not illustrated).

With reference to FIG. 1, the thermoplastic composite pipe 1 delimits an inner passageway 13 for the circulation of a fluid, advantageously a petroleum fluid and in particular hydrocarbons. The inner passageway 13 extends along an axis A-A', between the upstream end and downstream end of the thermoplastic composite pipe 1. It opens out through the end pieces (not illustrated).

In the example in FIG. 1, the thermoplastic composite pipe 1 comprises at least one tubular internal polymer sheath 20 advantageously forming an inner sealing sheath, a tubular reinforcing composite structure 21 overwrapping the tubular sheath 20 and bonded thereto, and a sealing layer 22 which overwraps the reinforcing composite structure 21.

The tubular sheath 20 is intended sealingly to confine the fluid transported in the passageway 13. The tubular sheath 20 also has the function of protecting the reinforcing composite structure 21 against abrasion related to the presence of abrasive particles e.g. sand in the fluid transported in the passageway 13.

The tubular sheath 20 generally comprises a polymer chosen from among PEK (polyetherketone), PEEK (polyether ether ketone), PEEKK (polyetheretherketoneketone), PEKK (polyetherketoneketone), PEKEKK (polyetherketoneetherketoneketone), and a mixture thereof, preferably a PEEK (polyether ether ketone)

As a variant, the tubular sheath 20 comprises another polymer, preferably thermoplastic. For example, the polymer forming the tubular sheath 20 is chosen from among a polyolefin such as polyethylene or polypropylene, a polyamide such as PA11 or PA12, or a fluorinated polymer such as polyvinylidene fluoride PVDF), or copolymers of polyvinylidene fluoride and polyhexafluoropropylene (PVDF-HFP), PAI (polyamide-imide), PEI (polyether-imide), PSU (polysulfone), PPSU (polyphenylsulfone), PES (polyethersulfone), PAS (polyarylsulfone), PPE (polyphenylene ether), PPS (phenylene polysulfide), LCPs (liquid crystal polymers), PPA (polyphthalamide), the copolymers thereof, and/or mixtures thereof, or a mixture of one or more thereof with a polysiloxane, PTFE (polytetrafluoroethylene) or PFPE (perfluoropolyether).

The tubular sheath 20 may for example comprise a mixture of polyaryletherketone and a polysiloxane, such as those described in application WO 2019/150060.

The polymer of the tubular sheath 20 is advantageously of same type as that of the polymer matrix 40 defined below. By «of same type», in the present invention it is meant that the polymer of the tubular sheath 20 and the polymer of the polymer matrix 40 are able to melt and form a close mixture without phase separation after cooling. Typically, the polymer of the tubular sheath 20 is a polyaryletherketone (PAEK) such as polyether ether ketone (PEEK) or polyether ketoneketone (PEKK), or a mixture thereof.

The polymer of the tubular sheath 20 can be the PEEK such as defined above and used in the polymer matrix 40 defined below.

Preferably, the tubular sheath 20 comprises at least 50% by mass of the polymer defined above (or of the mixture thereof if it is a mixture), more preferably at least 75% by mass, further preferably at least 80% by mass, typically at least 90% by mass relative to the total mass of the tubular sheath 20.

In one preferred embodiment, the tubular sheath 20 is composed of one of the above-defined polymers or one of the above-defined mixtures and fillers and/or additives.

The thickness of the tubular sheath 20 is between 1 mm and 20 mm for example.

The tubular sheath 20 is formed of a tube in polymer material, of a strip in assembled polymer material, or of an impregnated polymer mat.

If the tubular sheath 20 is formed by a tube, it is advantageously obtained by extruding a thermoplastic tube chosen in particular from among the above-mentioned polymers.

If the tubular sheath 20 is formed by a strip in assembled polymer material, it is advantageously obtained by extrusion and winding thermoplastic strips of a polymer such as described above. Preferably, the turns of the winding of a first layer are contiguous (edge to edge without overlap) and the turns of an upper layer are arranged to obtain overlap of two adjacent lower strips ensuring the fluid tightness of the tubular sheath 20.

The reinforcing composite structure 21 overwraps the tubular sheath 20. It is assembled on the tubular sheath 20 to form an assembly bonded with the tubular sheath 20.

The reinforcing composite structure 21 comprises a winding of at least two laminated reinforcing layers, and optionally an anti-delamination layer inserted between at least two reinforcing layers.

Each laminated reinforcing layer comprises a superimposition of reinforcing composite layers.

With reference to FIG. 1, each reinforcing composite layer comprises a polymer matrix 40 and carbon fibres 42 embedded in the polymer matrix 40.

The polymer matrix 40 comprises the PEEK such as defined above. Preferably, the polymer matrix 40 comprises at least 50% by mass of the above-defined PEEK (or mixture thereof if it is a mixture), more preferably at least 75% by mass, further preferably at least 80% by mass, typically at least 90% by mass, preferably at least 95% by mass, relative to the total mass of the polymer matrix 40.

In one preferred embodiment, the polymer matrix 40 is composed of a PEEK defined above or a PEEK mixture as defined above, with fillers and/or additives. Carbon black is an example of a filler.

The carbon fibres 42 are preferably such as defined above.

The carbon fibres 42, for each of the reinforcing composite layers, are preferably arranged parallel to each other. As a variant, the carbon fibres 42 are crossed in two orthogonal directions, or arranged randomly in the matrix (not illustrated).

The length of the carbon fibres 42 in each composite layer is generally longer than 100 m, and in particular it is between 100 m and 4500 m.

Preferably, each reinforcing composite layer is formed by a winding of at least one composite strip 44 having several layers of carbon fibres 42 embedded in a polymer matrix 40, each strip having a length longer than at least 10 times the width thereof and at least 10 times the thickness thereof.

For example, the length of each composite strip 44 is longer than 100 m and is between 100 m and 4500 m. The width of each composite strip 44 is between 6 mm and 50 mm. The thickness of each composite strip 44 is between 0.1 mm and 1 mm.

Preferably, each composite strip 44, at 23° C., has a tensile modulus greater than 10 GPa, in particular between 30 GPa and 170 GPa, such as measured according to standard NF EN 2561, January 1996, elongation at failure greater than 1%, in particular between 1% and 5%, such as measured according to standard NF EN 2561, January 1996, and/or an ultimate tensile strength greater than 100 MPa, and in particular between 350 MPa and 3500 MPa such as measured according to standard NF EN 2561, January 1996.

When forming each reinforcing layer, the or each composite strip 44 is helically wound around the axis A-A' of the tubular sheath 20, and is heated to cause partial melting of the polymer matrix 40 and bonding with the successive turns of the composite strip 44 and tubular sheath 20, and optionally with the outer adjacent layer which can be another reinforcing layer, an anti-delamination layer, or a sealing layer 22.

The absolute value of the helical winding angle ß of each composite strip 44 relative to the axis A-A' of the thermoplastic composite pipe 1 is generally between 20° and 85°. This value is dependent on the targeted application. If the thermoplastic composite pipe is used alone (namely not inside a hybrid flexible pipe 10) and is intended to be placed under internal pressure and/or external pressure (flowline application) or as jumper line, this value is typically between 45 and 65°, preferably between 50° and 60°. If the thermoplastic composite pipe is used alone (namely not inside a hybrid flexible pipe 10) and is intended to be placed under internal, external pressure and under tension, this value is typically between 20 and 85°. If the thermoplastic composite pipe is intended to be used inside a hybrid pipe typically for flowline applications or riser applications, this value is typically between 50° and 85°, preferably between 55° and 70°. This ensures elongation of the composite under the effect of internal pressure.

Figure 2:
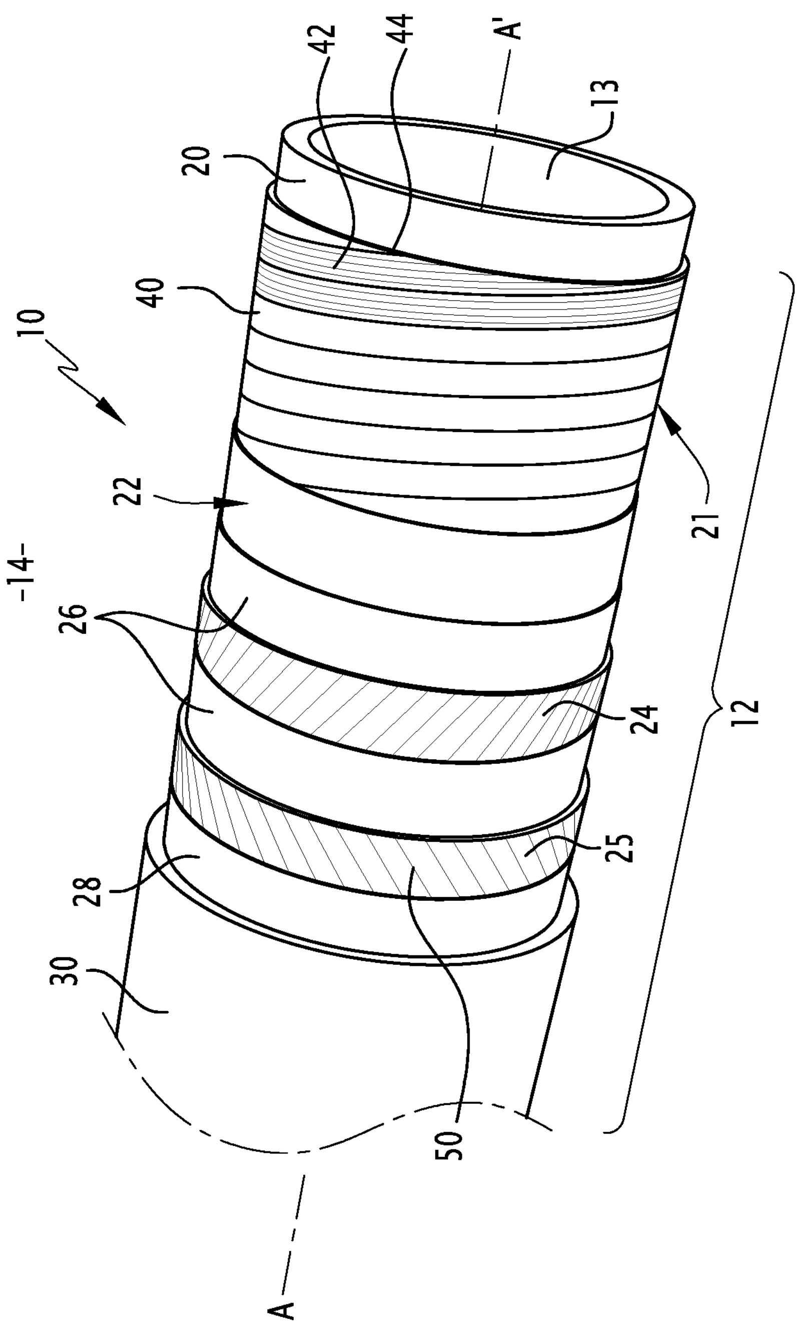
FIG. 2 is a perspective, partial cutaway view of a flexible pipe of the invention.

If the thermoplastic composite pipe is used as inner layer of a hybrid flexible pipe 10 (as illustrated in FIG. 2 and described below), said helical angle also allows adequate cooperation with the tensile armour layers 24, 25.

The thickness of each laminated composite layer is generally between 1 mm and 30 mm.

The number of composite layers within the reinforcing composite structure is typically from 2 to 300, in particular from 10 to 200, preferably from 20 to 100. In general, this number is always an even number to ensure the equilibrium of the reinforcing composite structure.

The sealing layer 22 is intended sealingly to confine the reinforcing composite structure 21. In particular, the sealing layer has the function of limiting, preferably preventing, contact between the external medium, water in particular, and the reinforcing composite structure 21.

The sealing layer 22 can be bonded or not bonded to the reinforcing composite structure 21.

The permeability of the sealing layer 22 is a function of the material chosen for fabrication thereof, and of the temperature at which the sealing layer 22 will subsequently be exposed.

The water permeability of the polymer materials suitable for forming the sealing layer 22 is between $1\times10^{-7}$ $cm^3(STP)\cdot cm^{-1}\cdot s^{-1}\cdot bar^{-1}$ and $2\times10^{-5}$ $cm^3(STP)\cdot cm^{-1}\cdot s^{-1}\cdot bar^{-1}$.

On this basis, for a thickness of sealing layer 22 of between 1 mm and 20 mm, the water permeability of the layer is $5\times10^{-8}$ $cm^3(STP)\cdot cm^2\cdot s^{-1}\cdot bar^{-1}$ to $2\times10^{-4}$ $cm^3(STP)\cdot cm^{-2}\cdot s^{-1}\cdot bar^{-1}$.

By «permeability of the sealing layer 22» it is meant the ability of said sealing layer 22 as a whole to allow water to pass through it. The permeability of the sealing layer can differ from the permeability of the constituent material of the layer, in particular on account of the presence of possible discontinuities or faults in the sealing layer which would facilitate the passing of water, or because the sealing layer is formed from a discontinuous structure such as a wound strip. The permeability of the sealing layer is meant to include herein that of the layer in its entirety including the material and possible interstices or interfaces between the discontinuous regions forming the layer. In the context of the invention, measurement of permeability refers to the permeability of the sealing layer as a whole such as contained in the thermoplastic composite pipe 1 of the invention.

The water permeability of the constituent material of the sealing layer 22 can be measured using the weight loss technique. This method of measuring the permeability of a liquid is described in particular in the publication "Emmanuel RICHAUD, Bruno FLACONNÈCHE, Jacques VERDU—*Biodiesel permeability in polyethylene*—Polymer Testing—Vol. 31, p. 170-1076-2012. Knowing the water permeability of the material, it is then possible to calculate the permeability of the sealing layer 22 by applying the following formula:

$$Klayer = \frac{Kmat.}{e}$$

with:

Klayer, the water permeability of the sealing layer (expressed in $cm^3(STP)\cdot cm^{-1}\cdot s^{-1}\cdot bar^{1}$), Kmat., the permeability of the constituent material of the sealing layer (expressed in $cm^3(STP)\cdot cm^{-2}\cdot s^{-1}\cdot bar^{-1}$), and e, the thickness of the sealing layer 22 (expressed in cm).

The sealing layer 22 is formed of thermoplastic material. For example, the polymer forming the sealing layer 22 is chosen from among a polyolefin, optionally crosslinked, such as polyethylene or polypropylene; a thermoplastic elastomer (TPE) such as thermoplastic polyurethane (TPE-U or TPU) or styrene copolymers (TPE-S or TPS), or copolymers of polypropylene and ethylene-propylene-diene (PP-EPDM), vulcanizates (TPE-V or TPV); a polyamide such as PA11 or PA12; or a fluorinated polymer such as polyvinylidene fluoride (PVDF) or copolymers of polyvinylidene fluoride and polyhexafluoropropylene (PVDF-HFP).

As a variant, the sealing layer 22 comprises a polymer chosen from among PEK (polyetherketone), PEEK (polyetheretherketone), PEEKK (polyetheretherketoneketone), PEKK (polyetherketoneketone), PEKEKK (polyetherketoneetherketoneetone), PAI (polyamide-imide), PEI (polyether-imide), PSU (polysulfone), PPSU (polyphenylsulfone), PES (polyethersulfone), PAS (polyarylsulfone), PPE (polyphenyleneether), PPS (phenylene polysulfide), LCPs liquid crystal polymers), PPA (polyphthalamide) and/or the mixture thereof or a mixture of one or more thereof with polysiloxane, PTFE (polytetrafluoroethylene) or PFPE (perfluoropolyether).

The sealing layer 22 for example may comprise a mixture of polyaryletherketone and a polysiloxane, such as those described in application WO2019/150060.

In one preferred embodiment, the sealing layer 22 is composed of one of the above-defined polymers or of one of the mixtures thereof and fillers and/or additives.

The polymer of the sealing layer 22 is advantageously of same type as that of the polymer matrix 40, more advantageously of same type as that of the polymer matrix 40 and as that of the sheath 20. By «of same type», in the meaning of the present invention, it is meant that the polymer of the sealing layer 22 and the polymer of the polymer matrix 40 and optionally the polymer of the tubular sheath 20 are able to melt and form a close mixture without phase separation, after cooling.

The polymer of the sealing layer 22 can be the PEEK defined above and used in the polymer matrix 40 defined above.

Preferably, the sealing layer 22 comprises at least 50% by mass of the above-defined polymer (or mixture thereof if it is a mixture), more preferably at least 75% by mass, further preferably at least 80% by mass, typically at least 90% by mass, relative to the total mass of the sealing layer 22.

In one preferred embodiment, the sealing layer 22 is composed of a thermoplastic material. The sealing layer 22 can be devoid of reinforcing materials.

Preferably, the sealing layer 22 is continuous. By «continuous» in the meaning of the present invention it is meant that the structure of the sealing layer 22 is the same at every point. In particular, the sealing layer 22 does not comprise radial through holes which could facilitate the passing of a fluid, water in particular, through the layer. A sealing layer 22 having closed porosity is therefore considered to be homogeneous in the meaning of the invention.

The thickness of the sealing layer 22 is between 1 mm et 20 mm for example, preferably it is less than or equal to 15 mm, preferably it is 3 mm to 10 mm.

In this case, the sealing layer 22 is formed of a single piece of tubular polymer sheath. The sealing layer is then typically formed from an extruded tubular sheath in thermoplastic polymer.

As a variant, the sealing layer 22 is formed from a discontinuous structure, for example from assembled polymer strip. For example, it is formed by winding at least two strips of a thermoplastic material and welding the at least two strips together.

When the sealing layer 22 is formed of a tubular sheath, it is advantageously obtained by extruding a thermoplastic material around the reinforcing composite structure 21, the material being chosen in particular from among the above-mentioned polymers. In this first case, the thickness of the sealing layer 22 is typically from 3 to 15 mm, preferably from 4 mm to 10 mm.

When the sealing layer 22 is formed of an assembled polymer strip, it is advantageously obtained by winding thermoplastic strips of a polymer such as described above, followed by a welding step of the thermoplastic strips. Preferably the turns of a first layer are contiguous (edge to edge without overlap) and the turns of an upper layer are arranged to obtain overlapping of two adjacent lower strips ensuring the fluid tightness of the sealing layer 22. In this second case, the thickness of the sealing layer 22 is typically less than 3 mm, advantageously less than 2 mm, more advantageously less than 1 mm In a first embodiment, the sealing layer 22 is not bonded to the reinforcing composite structure 21. The sealing layer 22 is then preferably devoid of reinforcing materials.

In this first embodiment, the polymer forming the sealing layer 22 is chosen from among a polyolefin, optionally crosslinked, such as polyethylene or polypropylene; a thermoplastic elastomer TPE such as thermoplastic polyurethane (TPE-U or TPU), or styrene copolymers (TPE-S or TPS), or copolymers of polypropylene and ethylene-propylene-diene (PP-EPDM), vulcanizates (TPE-V or TPV); a polyamide such as PA11 or PA12; a fluorinated polymer such as polyvinylidene fluoride (PVDF) or copolymers of polyvinylidene fluoride and polyhexafluoropropylene (PVDF-HFP).

The sealing layer 22 is then formed of a tubular sheath obtained by extruding a thermoplastic material around the reinforcing composite structure 21. The sealing layer 22 then has a thickness typically of 3 to 15 mm, preferably of 4 mm to 10 mm.

In a second embodiment, the sealing layer 22 is bonded to the reinforcing composite structure 21. The sealing layer 22 is then preferably devoid of reinforcing materials.

In this second embodiment, the sealing layer 22 comprises a polymer chosen from among PEK (polyetherketone), PEEK (polyetheretherketone), PEEKK (polyetheretherketoneketone), PEKK (polyetherketoneketone), PEKEKK (polyetherketoneetherketoneketone), PAI (polyamide-imide), PEI (polyether-imide), PSU (polysulfone), PPSU (polyphenylsulfone), PES (polyethersulfone), PAS (polyarylsulfone), PPE (polyphenyleneether), PPS (phenylene polysulfide) LCPs (liquid crystal polymers), PPA (polyphthalamide), the copolymers thereof and/or mixtures thereof or a mixture of one or more thereof with a polysiloxane, PTFE (polytetrafluoroethylene) or PFPE (perfluoropolyether). Preferably, the sealing layer 22 comprises PEEK (polyetheretherketone). The PEEK of the sealing layer 22 generally differs from that of the thermoplastic matrix 40 of the reinforcing layer of the reinforcing composite structure 21. The PEEK grades used to form the sealing layer 22 are grades with very high viscosity (viscosity in the molten state generally higher than 450 Pa·s), whereas the PEEK grades used to form the thermoplastic composite matrix 40 of the reinforcing layer of the reinforcing composite structure are generally grades of lower viscosity (viscosity lower than 200 Pa·s). The length of the polymer chains of the PEEK (molecular weight distribution) and hence the viscosity of the PEEKs of each of these layers are therefore different.

The sealing layer 22 is then obtained by extruding or winding thermoplastic strips previously obtained by pultrusion (or extrusion by pulling), typically by winding at least two thermoplastic strips, and the sealing layer 22 has a thickness of less than 3 mm, advantageously less than 2 mm, more advantageously less than 1 mm.

The method for preparing a thermoplastic composite pipe 1 of the invention is described below. It comprises the following steps:

1) providing a tubular sheath 20 of central axis (A-A') defining an inner passageway 13 for the circulation of fluids;
2) forming a reinforcing composite structure 21 around the tubular sheath 20 and bonded to the tubular sheath 20, the reinforcing composite structure being formed by winding at least two laminated reinforcing layers, each reinforcing layer having a thermoplastic matrix comprising a PEEK such as defined above and reinforced with carbon fibres 42;
3) forming, around the reinforcing composite structure 21, a sealing layer 22 in thermoplastic material.

Initially, the sheath 20 is fabricated and/or provided at the installation. Advantageously, the sheath 20 undergoes a prior pre-compacting step. The sheath 20 is then heated to bring the outer surface thereof to a temperature higher than 100° C., and in particular between 100° C. and 350° C.

Preferably, the shape of the sheath 20 must be the most cylindrical possible. For this purpose, it is possible to shape the outer surface of the sheath using a roller assembly rotating around the sheath. Said device is described for example in WO 2019/180050.

A plurality of reinforcing layers is then formed around the sheath 20 using the strips 44.

For each reinforcing layer, a plurality of strips 44 are wound in parallel around the sheath 20. Guide elements can be used to hold the strips 44 parallel to each other, with controlled clearance.

The parallel strips 44 are then heated, advantageously to a temperature of 350° C. to 500° C. (the melting point of PEEK being in the region of 350° C.). This advantageously leads to at least partial melting of the polymer matrix 40.

Advantageously, the strips 44 are helically wound around the outer surface defined by the sheath 20, generally with an absolute value of the helical winding angle ß of each composite strip 44 relative to axis A-A' of the thermoplastic composite pipe 1 such as defined above.

Preferably, and just after winding thereof, a roller assembly such as defined is driven in rotation and is applied to the strips 44 for compacting thereof. For this purpose, the successive rollers define a compacting generatrix pressing on the strips A 44.

The strips 44 are uniformly compacted, preventing disorganization of the carbon fibres 42 contained in the polymer matrix 40, whilst ensuring efficient distribution of the molten material of the polymer matrix 40 to form a continuous, fluid-tight reinforcing composite structure 21.

The reinforcing composite structure 21 next undergoes a post-compacting step at which the outer surface of the reinforcing composite structure 21 is softened by heating and again compacted by the rotating roller assemblies. The rollers of the roller assemblies are rolled with a helical trajectory along the respective strips 44, ensuring minimum disorganization of the carbon fibres 42.

Advantageously, the operations of pre-compacting, shaping of the tubular structure, and post-compacting are repeated to form several concentric reinforcing layers with other strips 44, as previously described.

The reinforcing composite structure 21 is therefore fabricated layer by layer, each new outer layer having a thickness substantially equal to that of a strip 44. These operations can be repeated several tens of times, in particular when the strip(s) 44 have a thickness that is much narrower than the desired final thickness of the wall of the reinforcing composite structure 21.

In addition, the characteristics of the strips 44 and/or the application and/or compacting parameters can be modified each time a new layer is added. For example, it is possible to modify the helical angle of the strips 44, in particular to cross the fibres of two superimposed layers.

The sealing layer 22 is then formed around the reinforcing composite structure 21.

In a first embodiment, the sealing layer 22 is formed by extruding a thermoplastic chosen from among the above-mentioned polymers. Preferably, in this embodiment, the thermoplastic material is extruded directly onto the reinforcing composite structure 21.

In this first embodiment, the thickness of the sealing layer 22 is typically from 3 to 15 mm, preferably from 4 mm to 10 mm.

In a second embodiment, the sealing layer 22 is formed by winding thermoplastic strips of a polymer such as described above around the reinforcing composite structure 21, followed by welding of the strips. Preferably, the turns of a first layer are contiguous (edge to edge without overlap) and the turns of an upper layer are arranged to obtain overlapping of two adjacent lower strips ensuring the fluid tightness of the tubular sheath 20.

Advantageously the strips 44 forming the reinforcing composite structure 21 and the thermoplastic strips forming the sealing layer 22 are wound at a same winding angle relative to the axis A-A' of the thermoplastic composite pipe 1.

Preferably, the sealing layer 22 is obtained by winding at least two thermoplastic strips around the reinforcing composite structure 21. The thermoplastic strips are typically prepared by extrusion of the thermoplastic material.

In one variant of embodiment, the sealing layer 22 is a bi-layer wrapped around the reinforcing composite structure 21 in which each layer comprises the winding of at least two thermoplastic strips prepared by extruding the thermoplastic material.

The welding of the thermoplastic strips of the sealing layer 22 is obtained with any known method, typically by heating the junction zones between the strips to a temperature of between 150° C. and 500° C., the temperature being dependent on the type of constituent thermoplastic polymer of the strips.

When the thermoplastic strips of the sealing layer 22 are in PEEK (melting point in the region of 350° C.), the heating temperature is advantageously between 350° C. and 500° C. When the thermoplastic strips are in PVDF (melting point in the region of 180° C.), the heating temperature is advantageously between 180° C. and 280° C., more preferably between 200° C. and 250° C.

Typically, the welding of the thermoplastic strips of the sealing layer 22 is obtained by thermal, electromagnetic or flash laser radiation. The welding of the thermoplastic strips allows the formation of a continuous sealing layer 22.

In this second embodiment, the thickness of the sealing layer 22 is typically less than 3 mm, advantageously less than 2 mm, more advantageously less than 1 mm.

When the polymer of the sealing layer 22 is of same type as that of the polymer matrix 40 of the reinforcing composite structure 21, namely PEEK such as defined above, the method of the invention allows the obtaining of a thermoplastic composite pipe 1 in which the sealing layer 22 is bonded or not bonded to the reinforcing comprise structure 21, depending on the method used to form the sealing layer 22.

In a first variant, the sealing layer 22 is formed by winding thermoplastic strips around the reinforcing composite structure 21, followed by welding the strips together. In this case the sealing layer 22 obtained is bonded to the reinforcing composite structure 21.

In a second variant, the sealing layer 22 is formed by extruding a thermoplastic material. In this case, the bonded or unbonded nature of the sealing layer 22 is dependent upon the temperature at which the extruded thermoplastic material and reinforcing composite structure 21 are placed in contact. If the extruded thermoplastic material and reinforcing composite structure 21 are placed in contact at a temperature lower than the melting point of the thermoplastic material, the resulting sealing layer 22 is not bonded to the reinforcing composite structure 21. Conversely, if the extruded thermoplastic material and reinforcing composite structure are placed in contact at a temperature higher than or equal to the melting point of the thermoplastic material, the resulting sealing layer 22 is bonded to the reinforcing composite structure 21.

However, if the polymer of the sealing layer 22 is not of same type as that of the polymer matrix 40, the method of the invention leads exclusively to the forming of a sealing layer 22 not bonded to the reinforcing composite structure 21.

A flexible pipe 10 of the invention is schematically illustrated in FIG. 2.

The flexible pipe 10 comprises a central section 12 partly illustrated in FIG. 1. At each of the axial ends of the central section 12, it comprises an end piece (not illustrated).

The flexible pipe 10 of the invention is not limited to a certain category of end pieces. Examples of end pieces which can be used with the flexible pipes 10 of the invention are described in WO 2019/068757.

With reference to FIG. 2, the flexible pipe 10 delimits an inner passageway 13 for the circulation of a fluid, advantageously a petroleum fluid The inner passageway 13 extends along an axis A-A', between the upstream end and downstream end of the flexible pipe 10. It opens out through the end pieces (not illustrated).

The flexible pipe 10 is intended to be placed through a body of water 14 from a fluid extraction facility, of hydrocarbons in particular.

The body of water 14 is a sea for example, or lake or ocean. The depth of the body of water 14 lying below the fluid extraction facility is between 500 m and 4000 m for example.

The facility comprises a surface assembly and bed assembly (not illustrated) or two surface assemblies which are advantageously connected together via the flexible pipe 10.

The surface assembly is a floating assembly for example. It is advantageously formed by a Floating Production, Storage and Offloading» unit (FPSO), a Floating Liquified Natural Gas unit (FLNG), a semi-submersible platform or offloading buoy. As a variant, the surface assembly is a fixed rigid structure of jacket type or an oscillating structure vertically moored to the seabed and for example possibly of Tension Leg Platform type (TLP).

In this example, the flexible pipe 10 connects the bed assembly to the surface assembly. The flexible pipe 10 is therefore partially immersed in the body of water 14 and has a top end placed in a volume of air As a variant, the flexible pipe 10 is fully immersed in the body of water 14 and connects together two bed assemblies for example (not illustrated).

In another variant, a flexible pipe 10 is partly immersed in the body of water 14 connecting together two surface assemblies for example, (typically an offloading buoy and FPSO). This is notably the case with flexible lines of Oil Offloading Line type (OOL).

As illustrated in FIG. 2, the flexible pipe 10 delimits a plurality of concentric layers around the axis A-A', which extend continuously along the central section 12 as far as the end pieces positioned at the ends of the pipe.

A flexible pipe 10 of the invention comprises the thermoplastic composite pipe 1 of the invention. It therefore comprises at least one tubular internal polymer sheath 20 advantageously forming an internal sealing sheath, a tubular reinforcing composite structure 21 overwrapping the tubular sheath 20 and being bonded thereto, and a sealing layer 22 overwrapping the reinforcing composite structure 21. The tubular internal polymer sheath 20, the reinforcing composite structure 21 and the sealing layer 22 are therefore such as defined above, and all the above-described embodiments in particular regarding the polymer matrix 40, the PEEK contained therein and the carbon fibres 42, are evidently applicable.

The flexible pipe 10 is devoid of an inner carcass, and is therefore designated by the term "smooth bore". The inner surface of the tubular sheath 20 directly delimits the inner passageway 13.

The flexible pipe 10 in this example also comprises a plurality of tensile armour layers 24, 25 arranged outwardly relative to the sealing layer 22 and not being bonded to the sealing layer 22. The armour layers 24, 25 can be in metal or composite material, in particular a thermoplastic or thermosetting polymer. Armour layers in composite material are typically obtained by a pultrusion process.

Advantageously, and depending on desired use, the flexible pipe 20 also comprises anti-wear layers 26 inserted between the sealing layer 22 and the tensile armour layers 24, 25, and between the tensile armour layers 24, 25. The anti-wear layers 26 are composed of one or more strips of thermoplastic material wound along axis (A-A') and which are not welded together, contrary to the sealing layer 22. These anti-wear layers 26 are therefore not fluid-tight.

The flexible pipe 10 also advantageously comprises a reinforcing tape 28 wound around tensile armour layers 24, 25, and an outer sheath 30 intended to impart mechanical and sealing protection to the flexible pipe 10.

In the example illustrated in FIG. 2, the flexible pipe 10 comprises an inner armour layer 24, and an outer armour layer 25 around which there is arranged the outer sheath 30.

Each armour layer 24, 25 comprises longitudinal armour elements 50 with long pitch winding around the axis A-A' of the pipe.

By «long pitch winding», it is meant that the absolute value relative to axis on A-A' of the helical angle is less than 55°, typically between 25° and 45°, and at times between 20° and 45°.

The armour elements 50 of a first layer 24 are generally wound at an opposite angle to the armour elements 50 of a second layer 25. Therefore, if the winding angle relative to axis A-A' of the armour elements 50 of the first layer 24 is +α, a being between 25° and 45°, the winding angle relative to axis A-A' of the armour elements 50 of the second layer 25 placed in contact with the first layer 24 is −α for example, with a between 25° and 45°.

The armour elements 50 are formed for example by metal wires. As a variant, the armour elements 50 are formed by composite wires or flat tapes, generally reinforced with reinforcing fibres.

The combination of a winding angle β of the composite strips 44 having an absolute value between 55° and 85°, preferably between 60 and 80°, with a winding angle α of the armour elements 50 having an absolute value of between 25° and 55°, preferably between 25° and 45°, prevents elongation of the reinforcing composite structure 21 via offset effect produced by the armour layers 24, 25.

The reinforcing composite structure 21 possibly having low tensile strength and tending to elongate under axial forces, the armour layers 24, 25 take up the axial forces and therefore prevent elongation of the reinforcing composite structure 21.

The optimal combination between winding angles α, β drastically reduces stresses in the tubular assembly formed by the internal sheath 20 and the reinforcing composite structure 21, and hence the thickness required to resist bending, internal pressure and/or collapse forces.

In addition, on account of the axial stiffness of the reinforcing composite structure 21, the tensile armour layers 24, 25 better resist axial compression under external deep-sea pressure conditions.

In addition, the winding angle α of the armour elements 50 having an absolute value of between 25° and 55°, taken in combination with winding angle ß of the composite strips 44 having an absolute value between 60° and 80° permits compression of the reinforcing composite structure 21, reducing the minimum bend radius.

The outer sheath 30 is intended to prevent permeation of fluid from outside the flexible pipe 10 toward the inside. It is advantageously in a polymer material, in particular based on a polyolefin such as polyethylene, on a polyamide such as PA11 or PA12, on a fluorinated polymer such as polyvinylidene fluoride (PVDF), or based on an elastomer thermoplastic comprising a polyolefin such as polyethylene or polypropylene associated with an elastomer of SBS type (styrene butadiene styrene), SEBS type (styrene ethylene butadiene styrene), EPDM type (ethylene propylene diene monomer), polybutadiene, polyisoprene or polyethylene-butylene.

The thickness of the outer sheath 30 is between 5 mm and 15 mm for example.

Each anti-wear layer 26 is formed for example of a polyolefin such as a polyethylene (PE) or a polypropylene (PP), a polyamide such as PA-11 or PA-12, a fluorinated polymer such as polyvinylidene fluoride (PVDF), a polyaryletherketone (PAEK) such as polyetheretherketone (PEEK) or polyetherketoneketone (PEKK), or a polymer material comprising a sulfone group such as polysulfone (PSU), polyethersulfone (PES) or polyphenylsulfone (PPSU). An anti-wear layer 26 is placed between the sealing layer 22 and the first tensile armour layer 24. Another anti-wear layer 26 is placed between the armour layers 24, 25, advantageously as indicated in standard API 17J, $4^{th}$ Edition May 2014.

The reinforcing tape 28 is formed for example of a high strength anti-buckling layer to limit buckling of the tensile armours 24, 25 in the event that the pipe should be subjected to a reverse end cap effect. This layer is in aramid for example. The tape is wound around the outermost armour layer 25, between the armour layer 25 and the outer sheath 30, advantageously as indicated in standard API 17J, $4^{th}$ Edition May 2014.

The method for preparing a flexible pipe 10 is described below. It comprises the following steps:

1') providing a thermoplastic composite pipe 1 such as defined above,

2') arranging, around the sealing layer 22 of the thermoplastic composite pipe 1, at least one tensile armour layer 24, 25, not bonded to the sealing layer 22, the at least one tensile armour layer 24, 25 comprising at least one armour element 50 wound around the sealing layer 22; and 3') optionally, arranging an outer sealing sheath 30 around the at least one tensile armour layer 24, 25.

The armour elements 50 of the tensile armour layers 24, 25 are wound around the sealing layer 22 of the thermoplastic composite pipe 1 such that they are not bonded to the sealing layer 22. An anti-wear layer 26 can be inserted between the sealing layer 22 and the first tensile armour layer 24, and between each tensile armour layer 24, 25.

A reinforcing tape 28 can then be wound around the outermost tensile armour layer 25.

The outer sheath 30 is next formed around armour layers 24, 25.

Examples

Example 1: Preparation of Reinforcing Composite Structures Comprising a Winding of Laminated Reinforcing Layers Formed from a PEEK Thermoplastic Matrix Reinforced with Carbon Fibres Reinforcing composite structures of small size (inner diameter 40 mm) were prepared by winding composite strips having several layers of carbon fibres (CF) embedded in a PEEK matrix (hereafter PEEK-CF). The helical winding angle ß of each strip was in the region of +/−65° relative to the axis of the reinforcing composite structure, said design corresponding to that targeted for a TCP or HFP application. Each reinforcing composite structure surrounded and was bonded to the tubular internal sheath of 1.5 mm thickness in high viscosity PEEK (viscosity in the molten state higher than 450 Pa·s) to form TCPs. The tubular internal sheath was obtained with an extrusion process.

The characteristics of the PEEK-CF strips, of the PEEK components thereof and of the carbon fibres are detailed in Table 1. The carbon fibres were not sized.

TABLE 1

Description of the PEEK-CF strips and characteristics of the PEEK and carbon fibre components

| PEEK-CF | PEEK grade | Viscosity measrd. at 400° C. (ISO 11443) (Pa · s) | Charpy impact strength measrd. at 23° C. (ISO 179/1eA) (kJ/m$^2$) | PEEK polymer chain | Mp (GPC) (g/mol) | Mn (GPC) (g/mol) | PI (GPC) | Grade of carbon fibres | Volume fraction of carbon fibres (%) |
|---|---|---|---|---|---|---|---|---|---|
| 1 (comp.) | Grade A | 130 | 4.2 | Linear | 58300 | 34700 | 2.3 | AS4a | 50 |
| 2 (comp.) | Grade A | 130 | 4.2 | Linear | 58300 | 34700 | 2.3 | AS4a | 47 |
| 3 (comp.) | Grade A | 130 | 4.2 | Linear | 58300 | 34700 | 2.3 | AS4a | 44 |
| 4 (inv.) | Grade B | 209 | 6 | Branched | 73300 | 38100 | 2.2 | AS4a | 50 |

*before preparation of the reinforcing composite structure

In all cases, the absolute value of the helical winding angle ß of each strip relative to the axis of the thermoplastic composite structure was +/−65°.

Table 2 gives the design data of the reinforcing composite structures and the percent crystallinity measured on the reinforcing composite structures.

TABLE 2

Design data of TCP reinforcing composite structures and characterizations

| TCP | Strip used in Table 1 | Min. angle (expressed in absolute value) (°) | Max. angle (expressed in absolute value) (°) | Total thickness of reinforcing composite structure (mm) | Percent crystallinity of reinforcing composite structure (%) |
|---|---|---|---|---|---|
| 1 | 1 | 63 | 68 | 3.0 +/− 0.2 | 29 |
| 2 | 2 | 63 | 68 | 3.0 +/− 0.2 | 27 |
| 3 | 3 | 63 | 68 | 3.0 +/− 0.2 | 32 |
| 4 | 4 | 63 | 68 | 3.0 +/− 0.2 | 29 |

Example 2: Results of Bending Tests

The reinforcing composite structures in Example 1 were cut into several one-metre sections. Each section of composite structure was subjected to a pure bending cycle at a given strain level and then straightened. The section of composite structure was then subjected to destructive analysis of optical microscopy type to verify the presence of non-through-wall cracking or through-wall cracking. This protocol was reproduced on a new section of composite structure increasing the strain level compared with the section of composite structure previously tested, and up until the identification of a strain level allowing observation of at least one through-wall crack.

For each composite structure, this protocol allowed the defining of a strain range corresponding to the damage threshold, and a strain range corresponding to the through-wall cracking threshold.

It is known that by reducing the volume fraction of carbon fibres within the composite structure, it is possible to improve the flexural performance of TCPs. This is why TCPs 1, 2 and 3 were prepared only differing in the volume fraction of carbon fibres.

The results are given in Table 3 for composite structure TCP 1.

TABLE 3

Results of bending tests on TCP 1 (comparative)

| TCP | Section | Strain level (%) | Observation of non-through-wall crack (yes/no) | Observation of through-wall crack (yes/no) |
|---|---|---|---|---|
| 1 | 1 | 1.6 | no | no |
| 1 | 2 | 1.8 | yes | no |
| 1 | 3 | 2.0 | yes | no |
| 1 | 4 | 2.2 | yes | no |
| 1 | 5 | 2.4 | yes | yes |

The results are given in Table 4 for composite structure TCP 2.

TABLE 4

Results of bending tests on TCP 2 (comparative)

| TCP | Section | Strain level (%) | Observation of non-through-wall crack (yes/no) | Observation of through-wall crack (yes/no) |
|---|---|---|---|---|
| 2 | 1 | 1.6 | no | no |
| 2 | 2 | 1.8 | yes | no |
| 2 | 3 | 2.0 | yes | no |
| 2 | 4 | 2.2 | yes | no |
| 2 | 5 | 2.4 | yes | no |
| 2 | 6 | 2.6 | yes | yes |

The results are given in Table 5 for composite structure TCP 3.

TABLE 5

Results of bending tests on TCP 3 (comparative)

| TCP | Section | Strain level (%) | Observation of non-through-wall crack (yes/no) | Observation of through-wall crack (yes/no) |
|---|---|---|---|---|
| 3 | 1 | 1.6 | no | no |
| 3 | 2 | 1.8 | no | no |
| 3 | 3 | 2.0 | yes | no |
| 3 | 4 | 2.2 | yes | no |
| 3 | 5 | 2.4 | yes | no |

TABLE 5-continued

Results of bending tests on TCP 3 (comparative)

| TCP | Section | Strain level (%) | Observation of non-through-wall crack (yes/no) | Observation of through-wall crack (yes/no) |
|---|---|---|---|---|
| 3 | 6 | 2.6 | yes | no |
| 3 | 7 | 2.8 | yes | no |
| 3 | 8 | 3.0 | yes | yes |

The results are given in Table 6 for composite structure TCP 4.

TABLE 6

Results of bending tests on TCP 4 (of the invention)

| TCP | Section | Strain level (%) | Observation of non-through-wall crack (yes/no) | Observation of through-wall crack (yes/no) |
|---|---|---|---|---|
| 4 | 1 | 1.6 | no | no |
| 4 | 2 | 1.8 | no | no |
| 4 | 3 | 2.0 | no | no |
| 4 | 4 | 2.2 | no | no |
| 4 | 5 | 2.4 | no | no |
| 4 | 6 | 2.6 | no | no |
| 4 | 7 | 2.8 | no | no |
| 4 | 8 | 3.0 | no | no |
| 4 | 9 | 3.2 | yes | no |
| 4 | 10 | 3.4 | yes | no |
| 4 | 11 | 3.6 | yes | no |
| 4 | 12 | 3.8 | yes | no |
| 4 | 13 | 4.0 | yes | no |
| 4 | 14 | 4.2 | yes | no |
| 4 | 15 | 4.4 | yes | no |
| 4 | 16 | 4.6 | yes | no |
| 4 | 17 | 4.8 | yes | no |
| 4 | 18 | 5.0 | yes | no |
| 4 | 19 | 5.2 | yes | no |
| 4 | 20 | 5.4 | yes | no |
| 4 | 21 | 5.6 | yes | no |
| 4 | 22 | 5.8 | yes | no |
| 4 | 23 | 6.0 | yes | yes |

The comparison between strain levels corresponding to identification of damage thresholds and through-wall cracking thresholds of the reinforcing composite structures TCP 1, TCP 2 and TCP 3 (all comparative) allows confirmation that the decrease in fibre content has a positive but limited effect on the improvement in flexural performance of a TCP reinforcing composite structure.

The volume fraction of carbon fibres in the reinforcing composite structure TCP 4 (of the invention) is 50%, and therefore higher than the volume fraction of carbon fibres in the reinforcing composite structures TCP2 (47%) and TCP3 (44%). Despite this, unexpectedly:

- the strain level corresponding to onset of the damage threshold of the reinforcing composite structure TCP 4 (of the invention) is at least 50% higher than that obtained with the reinforcing composite structures TCP 1, TCP2 or TCP3;
- the strain level on loss of fluid tightness (due to a through-wall crack) of the reinforcing composite structure TCP 4 is at least 100% higher than that obtained with the reinforcing composite structures TCP 1, TCP 2 or TCP 3.

These results show an improvement in the flexural performance of a TCP having a reinforcing composite structure such as defined in the application. This improvement is greater than that observed by reducing fibre content.

The invention claimed is:

1. A thermoplastic composite pipe intended for transporting fluids, comprising from the inside toward the outside:

- a tubular internal sheath of axis (A-A') defining an inner passageway for the circulation of fluids; and
- a reinforcing composite structure around the tubular sheath and which is bonded to the tubular sheath, the reinforcing composite structure comprising a winding of at least two laminated reinforcing layers, each reinforcing layer being made from a thermoplastic matrix comprising a polyether ether ketone reinforced with carbon fibres, said polyether ether ketone having:
- a molecular weight distribution by gel permeation chromatography (GPC) such that:
- the number average molecular weight (Mn) is higher than 38,000 g/mol,
- the peak molecular weight (Mp) is higher than 70,000 g/mol, and
- the polydispersity index (PI) is lower than 2.3, and
- a Charpy Impact strength measured at 23° C. according to standard ISO 179/1eA of 2010 greater than or equal to 5.5 kJ/m$^2$.

2. The thermoplastic composite pipe according to claim 1, wherein the polyether ether ketone has viscosity as measured at 400° C. according to standard ISO 11443 of 2021 higher than 200 Pa·s.

3. The thermoplastic composite pipe according to claim 1, wherein the polyether ether ketone is linear or branched.

4. The thermoplastic composite pipe according to claim 1, wherein the polyether ether ketone has terminal groups chosen from the group composed of fluorine, hydrogen, diphenyl ether, phenyl, methylphenyl, dimethylphenyl and methoxyphenyl.

5. The thermoplastic composite pipe according to claim 1, wherein the polyether ether ketone was obtained by polymerization via nucleophilic substitution or by polymerization via electrophilic addition.

6. The thermoplastic composite pipe according to claim 1, wherein the carbon fibres have a size content as determined according to standard ISO 10548 of 2002 corrected in 2008 of less than 1%.

7. The thermoplastic composite pipe according to claim 1, wherein the volume proportion of carbon fibres is from 30 to 70% relative to the volume of each reinforcing layer.

8. The thermoplastic composite pipe according to claim 1, comprising at least one sealing layer in a thermoplastic material around the reinforcing composite structure.

9. A flexible pipe intended for transporting fluids comprising, from the inside toward the outside:

- the thermoplastic composite pipe according to claim 1;
- at least one tensile armour layer not bonded to an outermost layer of the thermoplastic composite pipe, the at least one tensile armour layer comprising at least one armour element wound around said outermost layer of the thermoplastic composite pipe; and
- optionally, an outer sealing sheath arranged around said at least one tensile armour layer.

10. A method for preparing the thermoplastic composite pipe according to claim 1, comprising the following steps:

- providing the tubular sheath of central axis (A-A') defining the inner passageway for the circulation of fluids;
- forming the reinforcing composite structure around the tubular sheath and bonded to the tubular sheath, the reinforcing composite structure being formed by winding at least two laminated reinforcing layers, each reinforcing layer having the thermoplastic matrix comprising a polyether ether ketone having:

the molecular weight distribution under gel permeation chromatography (GPC) such that, the number average molecular weight (Mn) is higher than 38,000 g/mol, the peak molecular weight (Mp) is higher than 70,000 g/mol, and the polydispersity index (PI) is lower than 2.3, and a Charpy Impact strength measured at 23° C. according to standard ISO 179/1eA of 2010 greater than or equal 5.5 $kJ/m^2$ and the polyether ether ketone being reinforced with carbon fibres;

optionally, forming around the reinforcing composite structure, a sealing layer in thermoplastic material.

11. A method for preparing a flexible pipe according to claim 9, comprising the following steps:

disposing, around the outermost layer of the thermoplastic composite pipe, at least one tensile armour layer not bonded to said outermost layer, the at least one tensile armour layer comprising at least one armour element wound around said outermost layer; and optionally, arranging an outer sealing sheath around said at least one tensile armour layer.

* * * * *